3,632,520
Patented Jan. 4, 1972

3,632,520
RADIOISOTOPE FUEL
Harold J. Garber, Pittsburgh, Pa., assignor to the United States of America as represented by the United States Atomic Energy Commission
Filed Jan. 4, 1968, Ser. No. 695,782
Int. Cl. C09k 3/00
U.S. Cl. 252—301.1                                                    2 Claims

ABSTRACT OF THE DISCLOSURE

A radioisotope fuel source whose gamma-ray emission is so low as to be harmless having reasonably constant power output over a long interval of about 50 years. The source includes at least a pair of isotopes such as Pu–238 and Pu–241. One isotope, Pu–238, has a decreasing thermal power output after the start of delivery of power and the other, Pu–241, has a low thermal power output at the start of delivery of power and an increasing thermal power output after the start of delivery of power; the increase in the second (Pu–241) compensating for the decrease of the first (Pu–238).

BACKGROUND OF THE INVENTION

This invention relates to generation of power in places where commercial power is not available and has particular relationship to power generation in which the primary source is a radioisotope or radioactive nuclide. In the interest of concreteness the generation of power for heart pacers is elaborately discussed throughout this application but it is to be understood that the generators of this invention also have marine, terrestrial and space applications, and that to the extent that this invention is applicable, to uses of other types than heart pacers, such applications fall within its scope.

A heart pacer or pacemaker is a power generator installed within the body of an animal which produces within the body electrical pulses stimulating and pacing the beating of the heart of the animal. Such a pacer includes a primary source such as a radioisotope fuel which generates heat, a heat to electricity converter, such as a thermopile, and an electrical pulser which converts the electrical power demand from the pile into pacing pulses for the heart.

This invention concerns itself only with the radio-isotope fuel. The installation or removal of the heart pacer involves a major operation and it is essential that the necessity for repeated operations to install or replace components of pacers be minimized or eliminated altogether. It is then desirable that the pacer include a long-life radio-isotope fuel source and it is an object of this invention to provide such a source. Since the source is within the body of the animal it is essential that the fuel source emit no gamma-rays or have insufficient gamma-ray activity to harm the patient and it is an object of this invention to provide a long-life radioisotope fuel source which shall emit no gamma-rays of harmful magnitude.

Radioactive nuclides that have, in accordance with the teachings of the prior art, been used or considered as heat sources for radiosotopic power devices for medical, marine, terrestrial, and space applications (as for example, Co–60, Sr–90, Ce–137, Ce–144, Pm–147, Tm–170, Po–210, Th–228, Pu–238, Am–241, Cm–242, Cm–244) have in common a weakness, in that their thermal power output decreases with the passing of time. This degradation behavior is a direct consequence of the radioactive decay kinetics characteristics of the parent nuclide and ensuring daughter or descendant nuclides resulting from the decay. Basically, the degradation in the theraml power output stems from the fact that the first and subsequent daughters in the parent nuclide decay scheme liberate less energy per unit time than that associated with the decay of the parent nuclide. The exact manner in which the instantaneous thermal power curve for a nuclide system varies with time is dictated by the magnitudes of the decay constants and energies, the latter depending on the energy spectrums of the various decay modes involved (including alpha, beta, gamma, neutrons, spontaneous fissioning, etc.). The details of the variation of specific power output (thermal watts per gram of original parent nuclide) with time for a particular parent nuclide are some times complicated, because for a given parent nuclide the decay scheme may involve as many at 15–20 nuclide species as the system runs down toward the final nuclearly stable element.

This decreasing specific thermal power output characteristic leads to objectionable features, insofar as a radioistotope fueled thermoelectric power generator structure and performance are concerned. The more pertinent objectionable features and weaknesses are:

(1) The electrical power output of the device decreases with the passing of time, ultimately falling to a level that precludes its further use after the output drops below the minimal value required.

(2) Normally the electrical power output of a generator is pegged at some minimum value at the mission end-of-life point. The thermal output of the isotopic fuel must then also be pegged at a corresponding end-of-life point and the device has to be fabricated with sufficient isotopic fuel to correspond to the end-of-life conditions and requirement. Extra fuel must then be used at the start, the extra quantity being equivalent to that which decays away between the time of fabrication to end-of-life point. This extra fuel imposes design and structure penalties in addition to wasting costly materials.

(3) The requirement for fueling the devices with extra isotope leads to a simultaneous need to incorporate additional adequate means into the systems to dissipate the extra heat and the additional electrical power generated. These contribute to an inefficiency for the system performance, and are likewise reflected as extra hardware items for the device and extra loads on the system thermoelectrics and electronics components. In the case of the pacemaker, or for space applications, this extra amount of hardware and system mass is objectionable, in view of the demand to keep the device size and mass as compact as practicable. The extra loads on the system thermoelectric and the electronics components also contributes to added and accelerated degradation of these components.

(4) If the fuel is an alpha emitter producing helium as a consequence of the parent and daughter decay processes, the incorporation of extra fuel concomitantly generates extra helium. To contain this helium and fuel against capsule rupture and dissemination of the radioactive nuclides, the capsule size by design must be made larger than otherwise, and the capsule walls must be made correspondingly thicker than would have to be the case if extra fuel did not have to be built into the system.

(5) An additional objectionable consequence of having to incorporate extra fuel into the device is the corresponding increase of radiation generated by the device. This problem is most acute for medical devices like the pacemaker where shielding can only be minimal in order to keep the system dimensions and mass as small as practicable. This is equally true for devices intended for space applications where compactness is an over-riding consideration, or in the case of special devices where direct handling is required during device fabrication and utilization.

As an example of "extra" fuel requirements imposed by the degradation of the power characteristic, listed under paragraph 2 above, consider the case of the radioisotope powered cardiac pacemaker or heart pacer. Presently a heart pacer is pegged at an 11-year useful life. This life requires .123 thermal watt to provide the electrical power demands of the pacemaker electronics and to take care of the thermal losses inherent in this apparatus. Based on calculations for "typical" Pu–238 product as made at the United States Atomic Energy Commission's Savannah River Plant, the specific thermal power of this material amounts to .4392 and .4037 thermal watt per gram at the zero and 11-year time points respectively. Thus the device has to be fueled with $.123/.4037=.3047$ gram of fuel, whereas, if the power characteristic were flat from the start to the end of the life only $.123/.4392=.2801$ gram of fuel would have been required. These numbers also show that at the zero-time point the system is receiving $.3047 \times .4392 = .1338$ thermal watt as compared to the .123 thermal watt actually required. The extra mass of $.3047 - .3801 = .0246$ gram of "typical" Pu–238 per pacemaker (8.8% extra fuel) is a highly important disadvantage considering the current short supply of high quality Pu–238 and anticipated annual requirements for heart pacers exceeding 20,000. Fueling of 20,000 pacemakers of the current 11-year life design would require $20,000 \times .3047 = 6094$ grams of "typical" Pu–238, and if the power characteristic were flat only $$20,000 \times .2801 = 5,602 \text{ grams}$$

would be required. The extra $6094 - 5602 = 492$ grams of fuel would be sufficient to produce $492/.2801 = 1,756$ additional pacemakers.

The 11-year life of the heart pacer is selected on the basis that the more probable users are relatively old individuals. For younger people a 50-year life would be a necessity. This leads to examining what the extra fuel requirements are for a 50-year device. At the 50 year point the specific power of "typical" Pu–238 product is .2992 thermal watt per gram of starting material. Consequently the fuel loading in this case is $.123/.2992 = .4111$ gram per pacemaker, and the initial power fed to the device is $.4111 \times .4392 = .1806$ thermal watt, which is 46.8 percent above the .123 watt figure. For 20,000 devices $$20,000 \times .4111 = 8,222 \text{ grams}$$

of Pu–238 product would be required, of which $$8,222 - 5,602 = 2,620 \text{ grams}$$

constitutes "extra" material. This extra 2,620 grams represents a potential for $2,620/.2801 = 9,353$ additional pacemakers.

In the case of the 11-year pacemaker fueled with Pu–238 product, the effect of the extra fuel in the capsule or power-unit size as described in paragraph 4 above is magnified because the design of the primary capsule is based on the helium accumulation at the 50-year point, which is considerably longer than the 11-year device useful life. The magnification results from more alphas and hence helium from the parent nuclides and their daughters. In the case of "typical" Pu–238 product, the moles of cumulative helium generated per gram of original fuel are .0002762 and .001088 at the 11 and 50-year points respectively. In this instance, the penalty of the extra 8.8 percent fuel for an 11-year device is the need to construct the capsule against an extra helium accumulation of $$(.3047 - .2801) \times .001088 = .00002676 \text{ mole}$$

compared to the $.2801 \times .0002762 = .00007736$ mole that would exist at the 11-year point and if the power characteristic were flat; the increased helium effect amounts to 34.6 percent in contrast to the 8.8 percent extra fuel, amounting to a magnification ratio of 3.9.

In some respects, the increased radiation effects, described in paragraph 5 above, show a snowballing behavior. Direct alpha, beta, gamma and spontaneous fissions (with neutrons, gammas, alphas, betas from fissioning and fission products) increase in direct proportion to the extra fuel. In addition, the extra alphas, through the $(\alpha, \eta)$ reaction produces extra neutrons, and this leads to added gammas from decay of neutron activated radioactive products. Similarly, gamma photon and X-ray enhancement occurs from bremmstrahlung generated from beta particle inner and outer reactions with nuclei. In the case of the pacemaker and other medical devices this increase of radiations is detrimental both to the implantee and some of the components of the devices.

It is an object of this invention to overcome the above-described disadvantages and to provide a radioisotope fuel source that shall have a substantially constant thermal power output characteristic over a long time interval of the order of 50 years.

SUMMARY OF THE INVENTION

This invention arises from the discovery that a radioisotope fuel source, having a substantially constant thermal output characteristic, may be formed of a blend of radioisotopes, one of falling characteristic over the desired period and another of rising characteristic compensating for the first. In accordance with this invention such a fuel source made up of a blend of compensating isotopes is provided.

Typically such a blended fuel source may be regarded as including a nuclide A with decreasing power characteristic which initially supplies adequately the bulk of the power and a compensating nuclide B having a parent and descendants or daughters meeting of the following conditions.

(1) The parent nuclide (B) should decay via a very low beta energy (like .05 mev. or less) transformation to the first daughter. The half-life for decay of the parent should be reasonable, a satisfactory half-life being about 10–15 years. The reason for the soft or low-energy beta in the first decay mode is desirable to fulfill the low power condition from which the rising power curve can start. Because most alpha decay modes involve fairly energetic transformations, usually in the 2–8.8 mev. range, an alpha decay mode for the first step in the decay chain would not meet the initial low thermal watt output requirement, and the rising power characteristic would not be achieved. Low beta decay energies are advantageous in the case of medical applications like the heart pacemaker, in that the associated radiation hazard is low.

(2) The first daughter of nuclide B should decay by a resonably vigorous alpha mode (like 5–6 mev. or even higher) with a relatively long half-life (like 20–200 years, preferably about 70 to 100 years). This kind of energy release and half-life would offset the Pu–238 falling power curve. It is to be noted that this combination of requite properties for nuclide B makes it akin to a "corked-up" material in which the first daughter is retained in reserve, to be released by a "delayed action"

mechanism. In effect, the parent nuclide B would serve as a storehouse for latent energy which is released later in a controlled manner when it is needed to "fatten up" the falling power output of nuclide A.

(3) In the decay scheme of the B nuclide system there should be complete absence or minimum amount of high energy beta or gamma decay modes. This property, while not of importance as regards attaining the rising power characteristic, is essential if the nuclide blend is to be used for medical applications, such as the heart pacemaker to keep the radiation hazards and shielding requirements low and is for similar reasons advantageous in other applications.

(4) Nuclide B and its daughters should show only minimal spontaneous fissioning, with a half-life for spontaneous fission greater than $10^{12}$ years.

(5) Nuclide B should be relatively readily obtainable in adequately pure form in quantities adequate for the intended applications.

A blended source in accordance with this invention includes predominately the isotopes Pu-238 and Pu-241. A source having by weight 30% to 40% Pu-238 and 60% to 70% Pu-241 has a highly uniform thermal power output characteristic; the most uniform characteristic being achieved for 35% Pu-238 and 65% Pu-241. Pu-238 meets the requirements of nuclide A above. It is capable of supplying adequate thermal power initially but at a decaying rate. The following Tables I and II, below, show the key kinetics decay characteristics including the helium generation of pure Pu-238 fuel and of "typical" Pu-238 fuel, respectively, obtainable from the Savannah River Plant of the United States Atomic Energy Commission:

TABLE I.—SUMMARY OF HELIUM AND THERMAL POWER GENERATION KINETICS FOR PURE Pu-238 FUELED SYSTEMS

| Years elapsed | Moles of helium generated per gram of original parent nuclide [a] [b] | | | | | | | Thermal watt generation rate per gram of original parent nuclide | | | | | | |
|---|---|---|---|---|---|---|---|---|---|---|---|---|---|---|
| | Pu-236 | Pu-238 | Pu-239 | Pu-240 | Pu-241 | Pu-242 | Np-237 | Pu-236 | Pu-238 | Pu-239 | Pu-240 | Pu-241 | Pu-242 | Np-237 |
| 0 | .00000 | .00000 | .00000 | .00000 | .00000 | .00000 | .00000 | .17978+2 | .54480 | .18700−2 | .69085−2 | .14191−1 | .11024−3 | .19372−4 |
| .5 | .48898−3 | .16209−4 | .59506−7 | .21982−6 | .41220−7 | .36892−8 | .66480−9 | .16021+2 | .54270 | .18700−2 | .69081−2 | .16599−1 | .11024−3 | .20223−4 |
| 1 | .92167−3 | .32434−4 | .11902−6 | .43864−6 | .16447−6 | .73784−8 | .13292−8 | .14340+2 | .54089 | .18699−2 | .69077−2 | .18940−1 | .11024−3 | .20224−4 |
| 2 | .16658−2 | .64445−4 | .23802−6 | .87722−6 | .64818−6 | .14756−7 | .26585−8 | .11646+2 | .53644 | .18699−2 | .69070−2 | .23431−1 | .11024−3 | .20224−4 |
| 3 | .22811−2 | .96354−4 | .35703−6 | .13157−5 | .14339−5 | .22135−7 | .39874−8 | .96327+1 | .53231 | .18698−2 | .69063−2 | .27678−1 | .11024−3 | .20224−4 |
| 4 | .27969−2 | .12800−3 | .47603−6 | .17542−5 | .25066−5 | .29513−7 | .53171−8 | .81447+1 | .52821 | .18698−2 | .69056−2 | .31605−1 | .11024−3 | .20224−4 |
| 5 | .32435−2 | .16036−3 | .59503−6 | .21926−5 | .38472−5 | .36891−7 | .66464−8 | .70184−1 | .52414 | .18697−2 | .69048−2 | .35496−1 | .11024−3 | .20224−4 |
| 6 | .36366−2 | .19044−3 | .71402−6 | .26310−5 | .54447−5 | .44270−7 | .79757−8 | .61669+1 | .52010 | .18696−2 | .69041−2 | .39087−1 | .11024−3 | .20224−4 |
| 7 | .39900−2 | .22141−3 | .83301−6 | .30694−5 | .72839−5 | .51648−7 | .93080−5 | .55190+1 | .51609 | .18696−2 | .69034−2 | .42482−1 | .11024−3 | .20225−4 |
| 8 | .43129−2 | .25206−3 | .95200−6 | .35077−5 | .93519−5 | .59026−7 | .10634−7 | .50228+1 | .51212 | .18695−2 | .69027−2 | .45692−1 | .11024−3 | .20225−4 |
| 9 | .46127−2 | .28260−3 | .10710−5 | .39460−5 | .11636−4 | .66405−7 | .11963−7 | .46307+1 | .50817 | .18695−2 | .69019−2 | .48726−1 | .11024−3 | .20225−4 |
| 10 | .48945−2 | .31268−3 | .11900−5 | .43842−5 | .14124−4 | .73783−7 | .13292−7 | .43414+1 | .50426 | .18694−2 | .69012−2 | .51592−1 | .11024−3 | .20225−4 |
| 11 | .51624−2 | .34275−3 | .13089−5 | .48224−5 | .16806−4 | .81161−7 | .14027−7 | .41069+1 | .50037 | .18694−2 | .69005−2 | .54301−1 | .11024−3 | .20225−4 |
| 12 | .54194−2 | .37237−3 | .14279−5 | .52605−5 | .19670−4 | .88539−7 | .16951−7 | .39207+1 | .49652 | .18693−2 | .68990−2 | .56860−1 | .11024−3 | .20225−4 |
| 13 | .56675−2 | .40181−3 | .15469−5 | .56985−5 | .22707−4 | .85918−7 | .17280−7 | .37711+1 | .49269 | .18693−2 | .68990−2 | .59277−1 | .11024−3 | .20225−4 |
| 14 | .59086−2 | .43134−3 | .16658−5 | .61366−5 | .25907−4 | .10329−6 | .18610−7 | .36492+1 | .48890 | .18692−2 | .68983−2 | .61560−1 | .11024−3 | .20225−4 |
| 15 | .61432−2 | .46024−3 | .17848−5 | .65746−5 | .29286−4 | .11067−6 | .19939−7 | .34586+1 | .48813 | .18691−2 | .68976−2 | .63714−1 | .11024−3 | .20225−4 |
| 16 | .63732−2 | .48902−3 | .19038−5 | .70125−5 | .32761−4 | .11805−6 | .21269−7 | .34642+1 | .48140 | .18691−2 | .68968−2 | .65749−1 | .11024−3 | .20225−4 |
| 17 | .65987−2 | .51763−3 | .20227−5 | .74504−5 | .36398−4 | .12543−6 | .22598−5 | .33924+1 | .47769 | .18690−2 | .68961−2 | .67667−1 | .11024−3 | .20225−4 |
| 18 | .68206−2 | .54615−3 | .21417−5 | .78882−5 | .40165−4 | .13280−8 | .22927−7 | .33301+1 | .47401 | .18690−2 | .68954−2 | .69479−1 | .11024−3 | .20226−4 |
| 19 | .70390−2 | .57471−3 | .22606−5 | .83260−5 | .44054−4 | .14018−6 | .25257−7 | .32754+1 | .47036 | .18689−2 | .68947−2 | .71187−2 | .11024−3 | .20226−4 |
| 20 | .72543−2 | .60210−3 | .23796−5 | .87638−5 | .48059−4 | .14756−6 | .20586−7 | .32265+1 | .46673 | .18689−2 | .68939−2 | .72797−1 | .11024−3 | .20226−4 |
| 21 | .74668−2 | .63000−3 | .24985−5 | .92015−5 | .52173−4 | .15493−6 | .27915−7 | .31821+1 | .46313 | .18688−2 | .68932−2 | .74316−1 | .11024−3 | .20226−4 |
| 22 | .76770−2 | .65751−3 | .26175−5 | .96392−5 | .56390−4 | .16232−6 | .29245−7 | .31413+1 | .45957 | .18688−2 | .68925−2 | .75746−1 | .11024−3 | .20226−4 |
| 23 | .78846−2 | .68482−3 | .27364−5 | .10076−4 | .60704−4 | .16969−6 | .30564−7 | .31033+1 | .45603 | .18687−2 | .68918−2 | .77094−1 | .11024−3 | .20226−4 |
| 24 | .80807−2 | .71191−3 | .28553−5 | .10514−4 | .65109−4 | .17707−6 | .31904−7 | .30676+1 | .45251 | .18687−2 | .68910−2 | .78364−1 | .11024−3 | .20226−4 |
| 25 | .82925−2 | .73880−3 | .29743−5 | .10951−4 | .69600−4 | .18445−6 | .33233−7 | .30338+1 | .44903 | .18686−2 | .68903−2 | .79559−1 | .10024−3 | .20228−4 |
| 50 | .12777−1 | .13475−2 | .59464−5 | .21875−4 | .19897−3 | .36890−6 | .66470−7 | .28821+1 | .37010 | .18673−2 | .68722−2 | .93805−1 | .11023−3 | .20230−4 |
| 75 | .16317−1 | .18495−2 | .89164−5 | .32814−4 | .33982−3 | .55334−6 | .99710−7 | .18824+1 | .30505 | .18660−2 | .68541−2 | .94861−1 | .11022−3 | .20233−4 |
| 100 | .19116−1 | .22831−2 | .11884−4 | .43635−4 | .47970−3 | .73776−6 | .13295−6 | .14875+1 | .25144 | .18647−2 | .68361−2 | .92465−1 | .11020−3 | .20239−4 |
| 200 | .25545−1 | .33079−2 | .23735−4 | .86813−4 | .99437−3 | .14764−5 | .26595−6 | .58000 | .11609 | .18594−2 | .67645−2 | .79857−1 | .11018−3 | .20247−4 |
| 300 | .28062−1 | .37905−2 | .35552−4 | .12953−3 | .14377−2 | .22129−5 | .39901−6 | .22629 | .53641−1 | .18541−2 | .66937−2 | .68048−1 | .11016−3 | .20255−4 |
| 400 | .29030−1 | .40138−2 | .47335−4 | .17181−3 | .18179−2 | .29503−5 | .53212−6 | .88187−1 | .24844−1 | .18488−2 | .66236−2 | .59012−1 | .11012−3 | .20270−4 |
| 600 | .29560−1 | .41658−2 | .70801−4 | .25505−3 | .24266−2 | .44264−5 | .80122−6 | .13408−1 | .54231−2 | .18383−2 | .64856−2 | .43308−1 | .11008−3 | .20285−4 |
| 800 | .29640−1 | .42001−2 | .94134−4 | .33655−3 | .28764−2 | .58985−5 | .10651−5 | .20382−2 | .12806−2 | .18279−2 | .63505−2 | .32227−1 | .11004−3 | .20300−4 |
| 1,000 | .29653−1 | .42092−2 | .11734−3 | .41635−3 | .32088−2 | .73718−5 | .13319−5 | .31265−3 | .41009−3 | .18175−2 | .61282−2 | .23817−1 | .10995−3 | .20338−4 |
| 1,500 | .29655−1 | .42156−2 | .17476−3 | .60866−3 | .37083−2 | .11062−4 | .19998−5 | .22273−5 | .58993−4 | .17919−2 | .58993−2 | .11195−1 | .10995−3 | .20338−4 |
| 2,000 | .29655−1 | .42229−2 | .23138−3 | .79110−3 | .39430−2 | .14730−4 | .26690−5 | .22494−7 | .17401−3 | .17665−2 | .55969−2 | .52693−2 | .10985−3 | .20376−4 |

[a] The number following an entry indicates the power of 10 by which the tabulated value is to be multiplied.
[b] Based on C-12 as 12.000000; atomic weights are: Pu-236=236.045148; Pu-238=238.048514; Pu-239=239.051220; Pu-240=240.053028; Pu-241=241.055753; Pu-242=242.057737; Np-237=237.047080.

TABLE II.—HELIUM AND THERMAL POWER GENERATION RATES FOR A "TYPICAL" PU-238 FUEL [a]

[Fuel composition: .0012% Pu-236, 80.5% Pu-238, 14.9% Pu-239, 2.9% Pu-240, .8% Pu-241, .1% Pu-242, .5% Np-237, .29988% others]

| Years elapsed | Cumulative moles of helium generated per gram of— | | Thermal watt generation rate per gram of— | |
|---|---|---|---|---|
| | Original fuel charge | Original Pu-238 in charge | Original fuel charge | Original Pu-238 in charge |
| 0 | .00000 | .00000 | .43917 | .54556 |
| .5 | .13056−4 | .16231−4 | .43750 | .54348 |
| 1 | .26142−4 | .32474−4 | .43606 | .54169 |
| 2 | .51946−4 | .64529−4 | .43251 | .53728 |
| 3 | .77632−4 | .96437−4 | .42922 | .53320 |
| 4 | .10318−3 | .12818−3 | .42595 | .52913 |
| 5 | .12847−3 | .15959−3 | .42270 | .52509 |
| 6 | .15353−3 | .19072−3 | .41947 | .52109 |
| 7 | .17851−3 | .22175−3 | .41627 | .51771 |
| 8 | .20323−3 | .25246−3 | .41310 | .51317 |
| 9 | .22786−3 | .28305−3 | .40995 | .50925 |
| 10 | .25213−3 | .31320−3 | .40683 | .50537 |
| 11 | .27624−3 | .34316−3 | .40371 | .50151 |
| 12 | .30028−3 | .37302−3 | .40063 | .49758 |
| 13 | .32404−3 | .40253−3 | .39757 | .49387 |
| 14 | .34786−3 | .43213−3 | .39454 | .49011 |
| 15 | .37119−3 | .46110−3 | .39152 | .48636 |
| 16 | .39441−3 | .48996−3 | .38853 | .48265 |
| 17 | .41750−3 | .51864−3 | .38556 | .47896 |
| 18 | .44052−3 | .54724−3 | .38261 | .47530 |
| 19 | .46314−3 | .57533−3 | .37969 | .47166 |
| 20 | .48569−3 | .60334−3 | .37678 | .46805 |
| 21 | .50821−3 | .63132−3 | .37389 | .46446 |
| 22 | .53042−3 | .65891−3 | .37104 | .46092 |
| 23 | .55247−3 | .68630−3 | .36820 | .45739 |
| 24 | .57434−3 | .71347−3 | .36537 | .45388 |
| 25 | .59606−3 | .74044−3 | .36258 | .45041 |
| 50 | .10878−2 | .13513−2 | .29916 | .37162 |
| 75 | .14938−2 | .18557−2 | .24680 | .30658 |
| 100 | .18286−2 | .22716−2 | .20362 | .25295 |
| 200 | .26769−2 | .33253−2 | .94565−1 | .11741 |
| 300 | .30719−2 | .38160−2 | .44209−1 | .54918−1 |
| 400 | .32577−2 | .40468−2 | .20939−1 | .26011−1 |
| 600 | .33908−2 | .42122−2 | .51766−2 | .64306−2 |
| 800 | .34279−2 | .42582−2 | .17526−2 | .21772−2 |
| 1,000 | .34436−2 | .42778−2 | .97200−3 | .12074−2 |
| 1,500 | .34669−2 | .43067−2 | .70714−3 | .87843−3 |
| 2,000 | .34884−2 | .43334−2 | .60795−3 | .75523−3 |

[a] "Typical" Pu-238 composition as stated in "Radiation Properties of Pu-238 Produced for Isotopic Power Generators," D. H. Stoddard and E. L. Albenesius, DP-984, July 1965, Savannah River Laboratory.

The numbers (−4, −3, −2) following each entry in Tables I and II indicate the power of 10 by which this entry is to be multiplied to obtain the actual magnitude. Thus, the number of moles of helium per gram of Pu-238 in the second row of the second column of Table II is $.16231 \times 10^{-4}$ or .000016231. Where a plus sign appears before such a number the multiplier is the indicated positive power of ten.

Pu-241 with reasonable approximation meets the conditions in paragraphs 1 through 5 above for nuclide B.

Pu-241 has a half-life of 12.9 years, decaying by parallel branching routes: 99.9995 percent by a .021 mev. beta mode to Am-241 and .0005 percent by a 4.88 mev. alpha mode to U-237. For practical purposes, the alpha mode of decay of Pu-241 is negligible. The Am-241 daughter which has a 458.1 year half-life in turn, decays by a 5.47 mev. alpha mode to Np-237 which is relatively inactive; having a 2,200,000 year half-life. The principal radiochemical constants for the Pu-241 system are shown in Table III below.

TABLE III.—PRINCIPAL RADIOCHEMICAL CONSTANTS FOR Pu-241 AND ITS DAUGHTERS

[Calculated From "Decay Schemes of Radioactive Nuclei," B. S. Dzhelepov and L. K. Peker]

| Nuclide | Nuclide mass [a] based on— | | Half life | | Decay constant year⁻¹ | Decay mode fraction | | Decay product | | Decay energy, mev. | | | | | Power generation rate | |
|---|---|---|---|---|---|---|---|---|---|---|---|---|---|---|---|---|
| | O-16 | C-12 | Usual | Years [b] | | Alpha | Beta | Alpha | Beta | Alpha | | Beta | | | Watt/mole | Watt/gram |
| | | | | | | | | | | Range | Average | Range | Average | | | |
| Pu-241 | 241.132148 | 241.055753 | 12.9 y | .1290+2 | .5373−1 | .000005 | .999995 | U-237 | Am-241 | 4.848-4.893 | 4.882 | .021 | .021 | | .34209−1 | .14191−1 |
| Am-241 | 241.132126 | 241.055731 | 458.1 y | .4581+3 | .1513−2 | 1.00000 | | Np-237 | | 5.240-5.540 | 5.473 | | | | .25318+2 | .10503 |
| U-237 | 237.122752 | 237.047627 | 6.75 d | .7700−3 | .9002+3 | | 1.00000 | | Np-237 | | | .142-.248 | .244 | | .67158+6 | .28331+4 |
| Np-237 | 237.122204 | 237.047080 | 2,200,200 y | .2200+7 | .3151−6 | 1.00000 | | Pa-233 | | 4.520-4.872 | 4.768 | | | | .45921−2 | .19372−4 |
| Pa-233 | 233.113000 | 233.030146 | 27.4 d | .3126−2 | .2217+3 | | 1.00000 | | U-233 | | | .145-.568 | .231 | | .15658+0 | .07192+3 |
| U-233 | 233.112308 | 233.038544 | 162,000 y | .1620+6 | .4279−5 | 1.00000 | | Th-229 | | 4.520-4.816 | 4.766 | | | | .62354−1 | .26757−3 |
| Th-229 | 229.103251 | 229.030667 | 7,340 y | .7340+4 | .9443−4 | 1.00000 | | Ra-225 | | 4.850-5.020 | 4.885 | | | | .14104+1 | .61581−2 |
| Ra-225 | 225.093885 | 225.022571 | 14.8 d | .1688−2 | .4106+3 | | 1.00000 | | Ac-225 | | | .320 | .320 | | .40173+6 | .17863+4 |
| Ac-225 | 225.093498 | 225.022185 | 10 d | .1141−2 | .6075+3 | 1.00000 | | Fr-221 | | 5.719-5.868 | 5.795 | | | | .10763+8 | .47834+3 |
| Fr-221 | 221.083284 | 221.013241 | 4.8 m | .9126−5 | .7595+5 | 1.00000 | | At-217 | | 6.080-6.300 | 6.245 | | | | .23221+10 | .10507+8 |
| At-217 | 217.072512 | 217.003740 | .018 s | .5704−9 | .1215+10 | 1.00000 | | Bi-213 | | 7.020 | 7.020 | | | | .26078+14 | .12017+12 |
| Bi-213 | 213.060956 | 212.993455 | 47 m | .8936−4 | .7757+4 | .98000 | .0200 | Tl-209 | Po-213 | 5.860 | 5.860 | .960-1.300 | 1.254 | | .31923+8 | .14987+6 |
| Po-213 | 213.059473 | 212.991972 | .0000042 s | .1331−12 | .5208+13 | 1.00000 | | Pb-209 | | 8.336 | 8.336 | | | | .13273+21 | .62321−18 |
| Tl-209 | 209.050676 | 208.984445 | 22 m | .4183−4 | .1657+5 | | 1.00000 | | Pb-209 | | | 2.000 | 2.000 | | .10132+9 | .48486+6 |
| Pb-209 | 209.046471 | 208.980242 | 3.22 h | .3673−2 | .1887+4 | | 1.00000 | | Bi-209 | | | .630 | .630 | | .36348+7 | .17393+5 |
| Bi-209 | 209.045794 | 208.979565 | 2×10¹⁵ y | .2000+18 | .3466−17 | 1.00000 | | Tl-205 | | 3.000 | 3.000 | | | | .31702−13 | .15213−15 |
| Tl-205 | 205.038480 | 204.973520 | ∞ | | .00000 | | | | | | | | | | .00000 | .00000 |

[a] Nuclide atomic masses based on O-16 as 16.000000 and on C-12 as 12.000000.

[b] The number following an entry indicates the power of 10 by which the tabulated value is to be multiplied.

Figure 1:
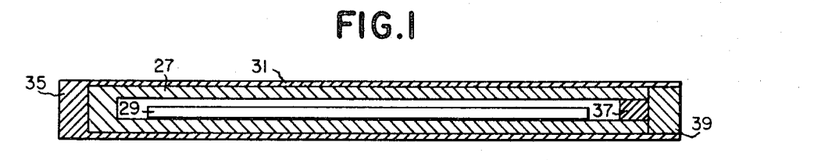
FIG. 1 is a view in section showing a fuel unit to which this invention is applicable.

The key decay kinetics characteristics of the Pu–241 system are shown in Table IV below:

tube or sheet 31. There may be a number of such units 27, 29, 31 each of which is in turn disposed within a

TABLE IV.—PLUTONIUM-241 DECAY KINETICS

[Calculated from "Decay Schemes of Radioactive Nuclei," B. S. Dzhelepov and L. K. Peker]

| Years elapsed | Moles of principal nuclides per original moles of Pu-241 [a] | | | | | | Moles of helium per gram / of original Pu-241 | Watts generated per gram [b] of original Pu-241 |
|---|---|---|---|---|---|---|---|---|
| | Pu-241 | Am-241 | U-237 | Np-237 | Pa-233 | He | | |
| 0 | 1.00000 | .00000 | .00000 | .00000 | .00000 | .00000 | .00000 | .14191−1 |
| .5 | .97349 | .26497−1 | .29054−9 | .10200−4 | .14242−13 | .99365−5 | .41220−7 | .16599−1 |
| 1 | .94768 | .52272−1 | .28283−9 | .40169−4 | .56586−13 | .39646−4 | .16447−6 | .18940−1 |
| 2 | .89811 | .10173 | .26804−9 | .15726−3 | .22253−12 | .15624−3 | .64818−6 | .23431−1 |
| 3 | .85113 | .14852 | .25402−9 | .34714−3 | .49195−12 | .34566−3 | .14339−5 | .27678−1 |
| 4 | .80660 | .19278 | .24073−9 | .60588−3 | .85926−12 | .60424−3 | .25066−5 | .31695−1 |
| 5 | .76441 | .23461 | .22813−9 | .92975−3 | .13191−11 | .92740−3 | .38472−5 | .35495−1 |
| 6 | .72442 | .27426 | .21620−9 | .13152−2 | .18666−11 | .13124−2 | .54447−5 | .39087−1 |
| 7 | .68652 | .31171 | .20489−9 | .17589−2 | .24969−11 | .17558−2 | .72839−5 | .42482−1 |
| 8 | .65061 | .34713 | .19417−9 | .22578−2 | .32056−11 | .22543−2 | .93519−5 | .45692−1 |
| 9 | .61657 | .38061 | .18401−9 | .28087−2 | .39883−11 | .28049−2 | .11636−4 | .48726−1 |
| 10 | .58423 | .41226 | .17439−9 | .34089−2 | .48411−11 | .34048−2 | .14124−4 | .51592−1 |
| 11 | .55375 | .44218 | .16526−9 | .40557−2 | .57600−11 | .40512−2 | .16806−4 | .54301−1 |
| 12 | .52478 | .47046 | .15662−9 | .47465−2 | .67415−11 | .47416−2 | .19670−4 | .56860−1 |
| 13 | .49733 | .49718 | .14843−9 | .54788−2 | .77822−11 | .54738−2 | .22707−4 | .59277−1 |
| 14 | .47131 | .52243 | .14066−9 | .62505−2 | .88787−11 | .62452−2 | .25907−4 | .61560−1 |
| 15 | .44666 | .54627 | .13330−9 | .70603−2 | .10029−10 | .70548−2 | .29266−4 | .63714−1 |
| 16 | .42329 | .56880 | .12633−9 | .79031−2 | .11227−10 | .78973−2 | .32761−4 | .65749−1 |
| 17 | .40115 | .59006 | .11972−9 | .87800−2 | .12473−10 | .87741−2 | .36398−4 | .67667−1 |
| 18 | .38016 | .61014 | .11346−9 | .96882−2 | .13763−10 | .96821−2 | .40165−4 | .69479−1 |
| 19 | .36028 | .62909 | .10752−9 | .10626−1 | .15096−10 | .10619−1 | .44054−4 | .71187−1 |
| 20 | .34143 | .64697 | .10190−9 | .11591−1 | .16468−10 | .11585−1 | .48059−4 | .72797−1 |
| 21 | .32357 | .66384 | .96570−10 | .12583−1 | .17878−10 | .12576−1 | .52173−4 | .74316−1 |
| 22 | .30664 | .67975 | .91519−10 | .13600−1 | .19323−10 | .13593−1 | .56390−4 | .75746−1 |
| 23 | .29060 | .69475 | .86731−10 | .14640−1 | .20801−10 | .14633−1 | .60704−4 | .77094−1 |
| 24 | .27540 | .70889 | .82194−10 | .15702−1 | .22310−10 | .15694−1 | .65109−4 | .78364−1 |
| 25 | .26099 | .72222 | .77894−10 | .16784−1 | .23849−10 | .16777−1 | .69600−4 | .79559−1 |
| 50 | .68118−1 | .88391 | .20330−10 | .47973−1 | .68175−10 | .47964−1 | .19897−3 | .93805−1 |
| 75 | .17778−1 | .90029 | .53061−11 | .81925−1 | .11643−9 | .81917−1 | .33982−3 | .94816−1 |
| 100 | .46401−2 | .87972 | .13848−11 | .11564 | .16418−9 | .11563 | .47970−3 | .92465−1 |
| 200 | .21531−4 | .76028 | .64260−14 | .23969 | .34066−9 | .23969 | .99437−3 | .79857−1 |
| 300 | .99909−7 | .65354 | .29818−16 | .34643 | .49238−9 | .34646 | .14372−2 | .68648−1 |
| 400 | .46359−9 | .56178 | .13836−18 | .43819 | .62279−9 | .43823 | .18179−2 | .59012−1 |
| 600 | .99819−14 | .41509 | .29791−23 | .58484 | .83122−9 | .58495 | .24266−2 | .43608−1 |
| 800 | .21492−18 | .30671 | .64144−28 | .69318 | .98521−9 | .69338 | .28764−2 | .32227−1 |
| 1,000 | .46276−23 | .22662 | .13811−32 | .77322 | .10989−8 | .77351 | .32088−2 | .23817−1 |
| 1,500 | .99548−35 | .10635 | .29710−44 | .89336 | .12697−8 | .89391 | .37083−2 | .11195−1 |
| 2,000 | .21414−46 | .49914−1 | .63912−56 | .94966 | .13497−8 | .95050 | .39430−2 | .52693−2 |

[a] The number following an entry indicates the power of 10 by which the tabulated value is to multiplied.

[b] Atomic weight of Pu-241 of 241.055753 based on C-12 as 12.000000.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DESCRIPTION OF PREFERRED EMBODIMENT

FIG. 1 shows a fuel unit in accordance with this invention which typically serves for a heart pacer. This unit includes an inner tube or sheath 27 within which there is a wire or bar 29 of radioactive material blended in accordance with this invention so that it has a substantially constant thermal power output over a long time interval. The inner tube 27 is enclosed within a middle tube or sheet 31. There may be a number of such units 27, 29, 31 each of which is in turn disposed within a partition of an outer can 35. Each of the tubes 27 and 31 and the partitions are sealed by plugs 37 and 39.

The blend which forms the bar or wire 29 is composed predominately of Pu-238 and Pu-241 and has a substantially constant thermal power characteristic.

Figure 2:
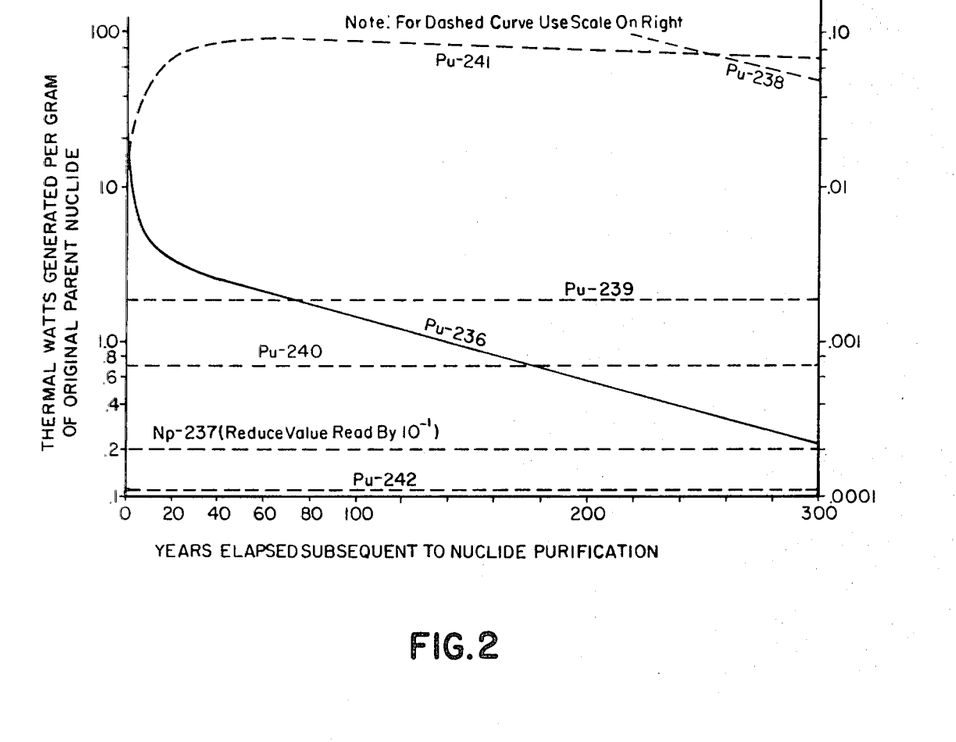
FIGS. 2, 3, 4, 5, 6, 7A, 7B and 8 are graphs showing the relationships of the isotopes in a blended fuel in accordance with this invention.

The relationship between the fall of the output characteristic of Pu-238 and the rise of the characteristic of Pu-241 is shown in FIG. 2. In this graph specific thermal power output, in watts, plotted vertically and time, in years, horizontally. The ordinates on the left correspond to the full lines and those on the right to the dashed lines. As shown the specific power output for Pu-241 rises until about the 68th year after purification while that for Pu-238 falls. The uniformity in power output is achieved by matching the rise and fall respectively.

The following Table V shows the influence of blend composition of Pu-238 and Pu-241 and time on the specific thermal power; three additional entries on this table show the influence of blend composition on the means power rate over 0–11, 0–20 and 0–50 year intervals.

TABLE V.—THERMAL POWER RATES FOR BLENDED PU-238 AND PU-241 NUCLIDES

| Years elapsed | Watts generated per gram of original nuclide for percentage Pu-238 by weight indicated [a] | | | | | | | | | | | | | | | |
|---|---|---|---|---|---|---|---|---|---|---|---|---|---|---|---|---|
| | 100% | 90% | 80% | 70% | 60% | 50% | 40% | 38% | 36% | 34% | 32% | 30% | 20% | 10% | 0% |
| 0 | .54480 | .49174 | .43863 | .38562 | .33256 | .27950 | .22643 | .21582 | .20521 | .19460 | .18399 | .17337 | .12031 | .67252−1 | .14191−1 |
| .5 | .54270 | .49009 | .43748 | .38487 | .33484 | .27965 | .22704 | .21652 | .20600 | .19547 | .18495 | .17443 | .12182 | .69209−1 | .16599−1 |
| 1 | .54089 | .48870 | .43650 | .38431 | .33211 | .27992 | .22772 | .21728 | .20684 | .19640 | .18596 | .17553 | .12333 | .71135−1 | .18940−1 |
| 2 | .53644 | .48514 | .43384 | .38254 | .33124 | .27994 | .22863 | .21837 | .20811 | .19785 | .18759 | .17733 | .12603 | .74732−1 | .23431−1 |
| 3 | .53231 | .48185 | .43138 | .38092 | .33046 | .27999 | .22953 | .21944 | .20935 | .19925 | .18916 | .17907 | .12860 | .78141−1 | .27678−1 |
| 4 | .52821 | .47856 | .42891 | .37926 | .32960 | .27995 | .23030 | .22037 | .21044 | .20051 | .19058 | .18065 | .13100 | .81347−1 | .31695−1 |
| 5 | .52414 | .47528 | .42641 | .37755 | .32868 | .27982 | .23095 | .22118 | .21141 | .20163 | .19186 | .18209 | .13322 | .84360−1 | .35495−1 |
| 6 | .52010 | .47200 | .42390 | .37580 | .32769 | .27959 | .23149 | .22187 | .21225 | .20263 | .19301 | .18339 | .13529 | .87188−1 | .39087−1 |
| 7 | .51609 | .46873 | .42137 | .37401 | .32665 | .27929 | .23193 | .22245 | .21298 | .20351 | .19404 | .18456 | .12720 | .89843−1 | .42482−1 |
| 8 | .51212 | .46548 | .41883 | .37219 | .32555 | .27891 | .23226 | .22293 | .21361 | .20428 | .19495 | .18562 | .13898 | .92335−1 | .45692−1 |
| 9 | .50817 | .46223 | .41628 | .37034 | .32439 | .27845 | .23250 | .22331 | .21413 | .20494 | .19575 | .18656 | .14061 | .94670−1 | .48726−1 |
| 10 | .50426 | .45901 | .41353 | .36846 | .32319 | .27793 | .23266 | .22361 | .21455 | .20550 | .19645 | .18739 | .14213 | .96859−1 | .51592−1 |
| 11 | .50037 | .45576 | .41116 | .36655 | .32194 | .27734 | .23273 | .22381 | .21489 | .20596 | .19704 | .18812 | .14351 | .98908−1 | .54301−1 |
| 12 | .49652 | .45255 | .40859 | .36462 | .32066 | .27669 | .23272 | .22393 | .21514 | .20634 | .19755 | .18876 | .14479 | .10083 | .56860−1 |
| 13 | .49269 | .44935 | .40601 | .36267 | .31932 | .27598 | .23264 | .22397 | .21531 | .20664 | .19797 | .18930 | .14596 | .10262 | .59277−1 |

See footnotes at end of table.

Figure 3:
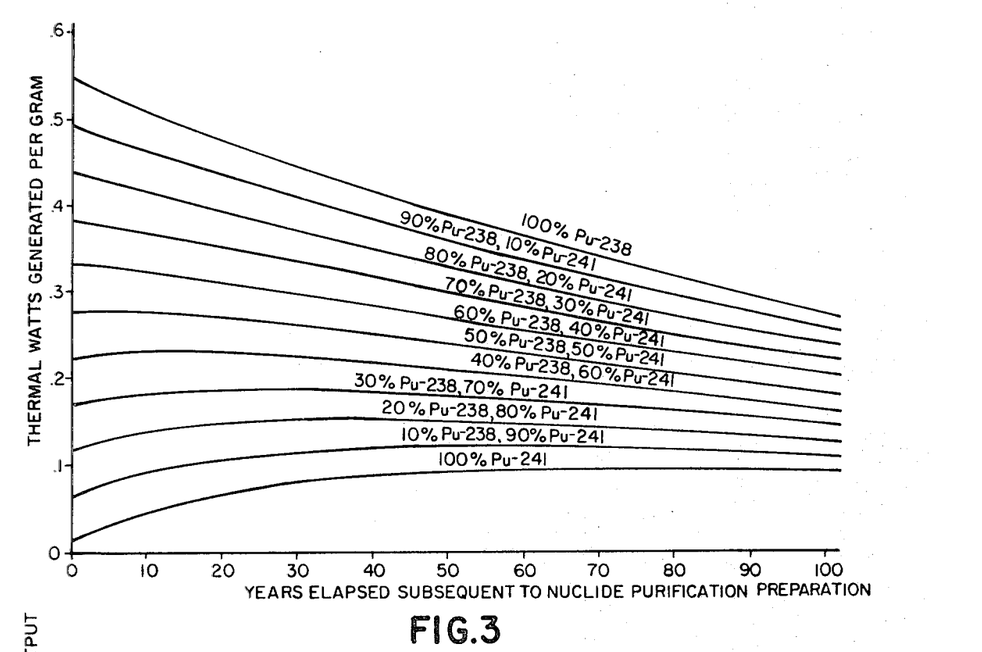
Figure 4:
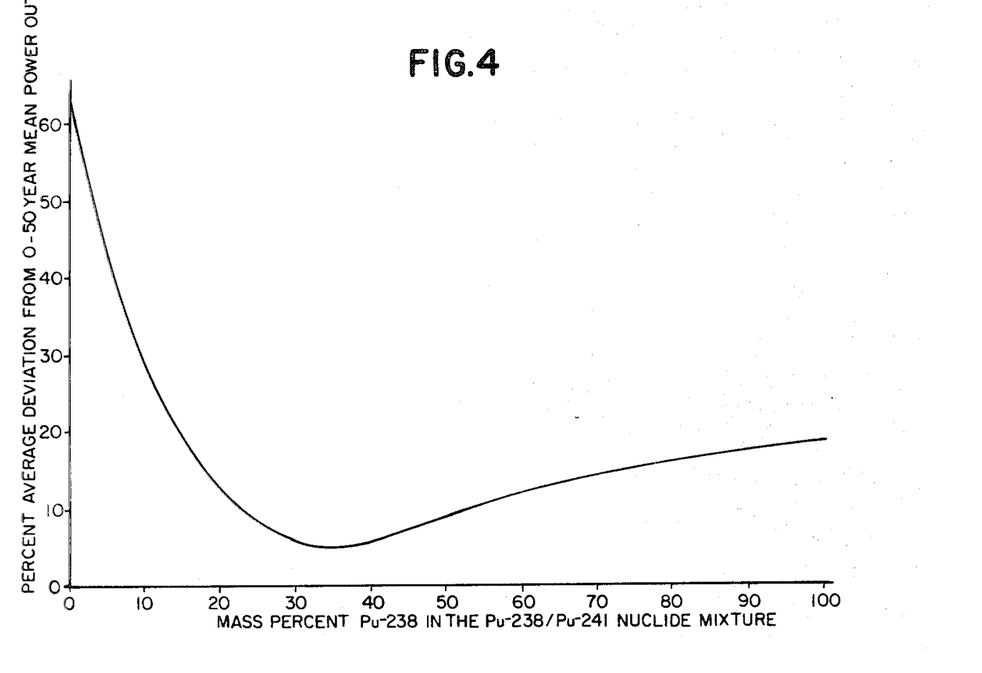

The entries in Table V and the associated graphical representation of these data in FIG. 3 shows the flat power characteristic that prevails over the 30 to 40 percent Pu-238 range for a 0–50 year time lapse. FIG. 4 shows that over a 50 year period, the optimum power flattening is associated with a 35% Pu-238:65% Pu-241 blend, for which the average deviation from the 50 year mean power output is 5 percent.

In FIG. 3 thermal power in watts generated per gram is plotted vertically and time horizontally for a plurality of blend compositions; the plot is a family of curves corresponding to the different compositions. In FIG. 4 the percent deviation from a 0 to 50 years mean power output is plotted vertically against the percent of Pu-238 in a blend.

Figure 5:
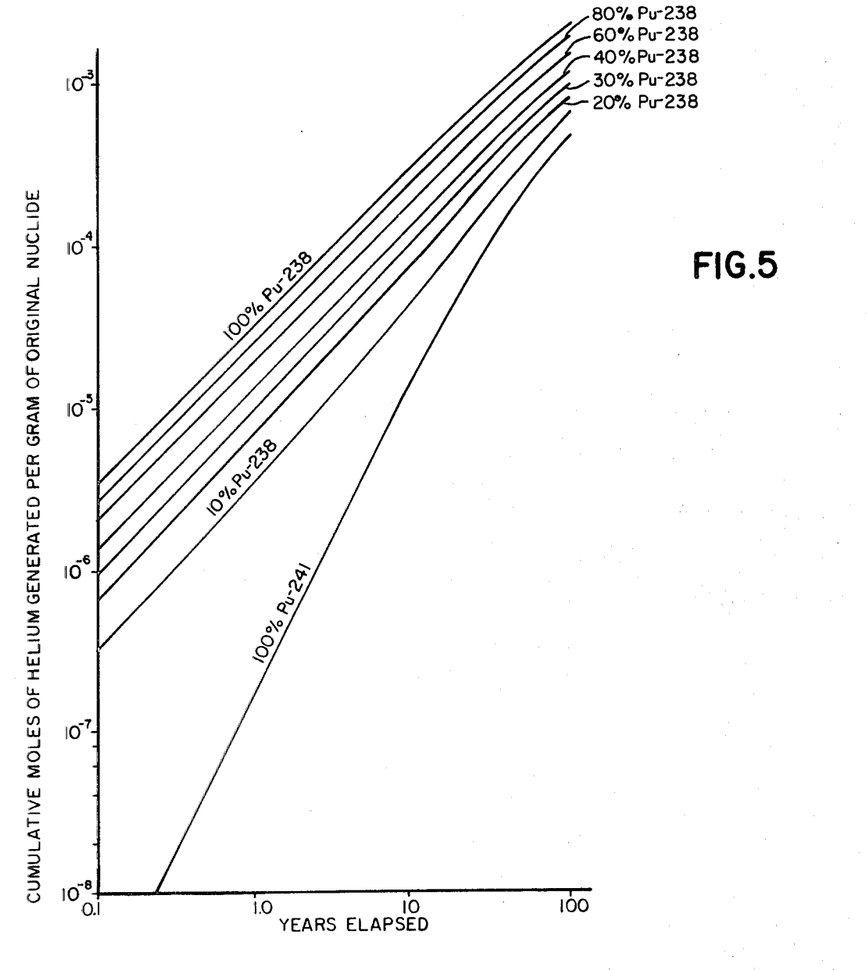

Table VI and FIG. 5 show the influence of blend composition and time on the specific cumulative helium.

TABLE V.—(Continued)

Watts generated per gram of original nuclide for percentage Pu-238 by weight indicated [a]

| Years elapsed | 100% | 90% | 80% | 70% | 60% | 50% | 40% | 38% | 36% | 34% | 32% | 30% | 20% | 10% | 0% |
|---|---|---|---|---|---|---|---|---|---|---|---|---|---|---|---|
| 14 | .48890 | .44617 | .40343 | .36070 | .31796 | .27523 | .23250 | .22395 | .21540 | .20686 | .19831 | .18976 | .14703 | .10429 | .61560−1 |
| 15 | .48613 | .44299 | .44085 | .35870 | .31656 | .27442 | .23228 | .22385 | .21542 | .20700 | .19857 | .19014 | .14800 | .10586 | .63714−1 |
| 16 | .48140 | .43983 | .39827 | .35670 | .31514 | .27357 | .23201 | .22370 | .21538 | .20707 | .19876 | .19044 | .14888 | .10731 | .65749−1 |
| 17 | .47769 | .43669 | .39569 | .35468 | .31368 | .27268 | .23168 | .22348 | .21528 | .20707 | .19887 | .19067 | .14967 | .10867 | .67667−1 |
| 18 | .47401 | .43356 | .39310 | .35265 | .31220 | .27174 | .23129 | .22320 | .21511 | .20702 | .19893 | .19084 | .15039 | .10993 | .69479−1 |
| 19 | .47036 | .43044 | .39053 | .35061 | .31069 | .27077 | .23086 | .22287 | .21489 | .20691 | .19892 | .19094 | .15102 | .11110 | .71187−1 |
| 20 | .46673 | .42734 | .38794 | .34855 | .30916 | .26976 | .23037 | .22249 | .21461 | .20673 | .19886 | .19098 | .15158 | .11229 | .72797−1 |
| 21 | .46313 | .42424 | .38537 | .34649 | .30760 | .26872 | .22984 | .22207 | .21429 | .20651 | .19874 | .19096 | .15206 | .11329 | .74316−1 |
| 22 | .45957 | .42119 | .38281 | .34442 | .30604 | .26766 | .22928 | .22160 | .21392 | .20625 | .19857 | .19089 | .15251 | .11413 | .75746−1 |
| 23 | .45603 | .41814 | .38024 | .34235 | .30446 | .26656 | .22867 | .22109 | .21351 | .20593 | .19835 | .19077 | .15288 | .11499 | .77094−1 |
| 24 | .45251 | .41610 | .37768 | .34027 | .30285 | .26544 | .22802 | .22054 | .21306 | .20557 | .19809 | .19061 | .15319 | .11578 | .78364−1 |
| 25 | .44903 | .41208 | .37514 | .33819 | .30124 | .26429 | .22735 | .21996 | .21257 | .20518 | .19779 | .19040 | .15345 | .11651 | .79559−1 |
| 50 | .37010 | .34247 | .31484 | .28721 | .25958 | .23195 | .20432 | .19880 | .19327 | .18775 | .18222 | .17669 | .14906 | .12143 | .93805−1 |
| 75 | .30505 | .28403 | .26301 | .24199 | .22097 | .19996 | .17894 | .17473 | .17053 | .16633 | .16212 | .15792 | .13690 | .11588 | .94861−1 |
| 100 | .25144 | .23554 | .21965 | .20375 | .18785 | .17195 | .15606 | .15288 | .14970 | .14652 | .14334 | .14016 | .12426 | .10836 | .92465−1 |

Mean power rate in watts per gram for the time interval indicated [b]

| 0–11 | .52228 | .47368 | .42507 | .37648 | .32787 | .27928 | .23067 | .22096 | .21124 | .20151 | .19180 | .18208 | .13347 | .84876−1 | .36276−1 |
| 0–20 | .50476 | .45919 | .41345 | .36800 | .32241 | .27683 | .23124 | .22213 | .21300 | .20389 | .19478 | .18565 | .14007 | .94480−1 | .48833−1 |
| 0–50 | .45184 | .41376 | .37567 | .33760 | .29952 | .26144 | .22336 | .21574 | .20813 | .20051 | .19290 | .18528 | .14720 | .10912 | .71089−1 |

[a] The number following an entry indicates the power of 10 by which the tabulated value is to be multiplied

[b] Mean calculated using three point approximate Simpson's rule.

TABLE VI.—CUMULATIVE HELIUM GENERATION FOR BLENDED Pu-238 AND Pu-241 NUCLIDES

Moles of helium generated per gram of original nuclide mixture for percentage Pu-238 indicated [a]

| Years elapsed | 100% | 90% | 80% | 70% | 60% | 50% | 40% | 38% | 36% | 34% | 32% | 30% | 20% | 10% | 0% |
|---|---|---|---|---|---|---|---|---|---|---|---|---|---|---|---|
| 0 | .00000 | .00000 | .00000 | .00000 | .00000 | .00000 | .00000 | .00000 | .00000 | .00000 | .00000 | .00000 | .00000 | .00000 | .00000 |
| 1 | .16209−4 | .14592−4 | .12975−4 | .11359−4 | .97419−5 | .81251−5 | .65083−5 | .61850−5 | .58616−5 | .55383−5 | .52149−5 | .48916−5 | .32748−5 | .16580−5 | .41220−7 |
| 2 | .32434−4 | .29207−4 | .25980−4 | .22753−4 | .19526−4 | .16299−4 | .13072−4 | .12427−4 | .11782−4 | .11136−4 | .10491−4 | .98453−5 | .66184−5 | .33914−5 | .16447−6 |
| 3 | .64445−4 | .58065−4 | .51686−4 | .45306−4 | .38926−4 | .32547−4 | .26167−4 | .24891−4 | .23615−4 | .22339−4 | .21063−4 | .19787−4 | .13408−4 | .70279−5 | .64818−6 |
| 4 | .96854−4 | .86862−4 | .77370−4 | .67878−4 | .58386−4 | .48894−4 | .39402−4 | .37504−4 | .35605−4 | .33707−4 | .31808−4 | .29910−4 | .20418−4 | .10926−4 | .14433−5 |
| 5 | .12800−3 | .11545−3 | .10290−3 | .90352−4 | .77803−4 | .65253−4 | .52704−4 | .50194−4 | .47684−4 | .45174−4 | .42664−4 | .40155−4 | .27605−4 | .15059−4 | .25066−5 |
| 6 | .15936−3 | .14381−3 | .12826−3 | .11271−3 | .97155−4 | .81604−4 | .66052−4 | .62942−4 | .59832−4 | .56722−4 | .53611−4 | .50501−4 | .34950−4 | .19398−4 | .38472−5 |
| 7 | .19044−3 | .17195−3 | .15345−3 | .13496−3 | .11646−3 | .97967−4 | .79473−4 | .75774−4 | .72075−4 | .68376−4 | .64677−4 | .60978−4 | .42484−4 | .23389−4 | .54947−5 |
| 8 | .22141−3 | .20000−3 | .17858−3 | .15717−3 | .13576−3 | .11435−3 | .92934−4 | .88653−4 | .84369−4 | .80087−4 | .75804−4 | .71522−4 | .50109−4 | .28697−4 | .72830−5 |
| 9 | .25206−3 | .22773−3 | .20352−3 | .17925−3 | .15498−3 | .13071−3 | .10644−3 | .10158−3 | .96727−4 | .91873−4 | .87018−4 | .82164−4 | .57894−4 | .33623−4 | .93519−5 |
| 10 | .28260−3 | .25550−3 | .22841−3 | .20131−3 | .17421−3 | .14712−3 | .12002−3 | .11460−3 | .10918−3 | .10376−3 | .98343−4 | .92924−4 | .65827−4 | .38731−4 | .11634−4 |
| 11 | .28292−3 | .28550−3 | .25927−3 | .22311−3 | .19326−3 | .16340−3 | .13355−3 | .12768−3 | .12160−3 | .11563−3 | .10966−3 | .10369−3 | .73835−4 | .43080−4 | .14124−4 |
| 12 | .34275−3 | .31016−3 | .27756−3 | .24497−3 | .21237−3 | .17978−3 | .14718−3 | .14066−3 | .13415−3 | .12763−3 | .12111−3 | .11459−3 | .81995−4 | .49400−4 | .16606−4 |
| 13 | .37237−3 | .33710−3 | .30183−3 | .26656−3 | .23129−3 | .19602−3 | .16075−3 | .15370−3 | .14664−3 | .13959−3 | .13253−3 | .12548−3 | .90210−4 | .54940−4 | .19670−4 |
| 14 | .40181−3 | .36390−3 | .32599−3 | .28808−3 | .25017−3 | .21229−3 | .17435−3 | .16677−3 | .15918−3 | .15160−3 | .14402−3 | .13644−3 | .98528−4 | .60817−4 | .22707−4 |
| 15 | .43134−3 | .39080−3 | .35025−3 | .30971−3 | .26917−3 | .22862−3 | .18808−3 | .17997−3 | .17188−3 | .16375−3 | .15565−3 | .14754−3 | .10699−3 | .66450−4 | .25907−4 |
| 16 | .46024−3 | .41714−3 | .37405−3 | .33095−3 | .28785−3 | .24475−3 | .20166−3 | .19304−3 | .18442−3 | .17580−3 | .16718−3 | .15856−3 | .11546−3 | .72363−4 | .29266−4 |
| 17 | .48902−3 | .44339−3 | .39777−3 | .35214−3 | .30652−3 | .26089−3 | .21526−3 | .20614−3 | .19701−3 | .18789−3 | .17876−3 | .16964−3 | .12401−3 | .78387−4 | .32761−4 |
| 18 | .51763−3 | .46951−3 | .42138−3 | .37326−3 | .32514−3 | .27701−3 | .22889−3 | .21927−3 | .20964−3 | .20002−3 | .19039−3 | .18077−3 | .13264−3 | .84521−4 | .36399−4 |
| 19 | .54615−3 | .49555−3 | .44495−3 | .39435−3 | .34376−3 | .29316−3 | .24256−3 | .23244−3 | .22232−3 | .21220−3 | .20208−3 | .19196−3 | .14136−3 | .90764−4 | .40165−4 |
| 20 | .57417−3 | .52116−3 | .46815−3 | .41514−3 | .36212−3 | .30911−3 | .25610−3 | .24550−3 | .23490−3 | .22429−3 | .21369−3 | .20309−3 | .15008−3 | .97066−4 | .44054−4 |
| 21 | .60210−3 | .54670−3 | .49129−3 | .43589−3 | .38048−3 | .32508−3 | .26968−3 | .25859−3 | .24751−3 | .23643−3 | .22535−3 | .21427−3 | .15857−3 | .10346−3 | .48059−4 |
| 22 | .63000−3 | .57222−3 | .51443−3 | .45665−3 | .39887−3 | .34109−3 | .28330−3 | .27175−3 | .26019−3 | .24863−3 | .23708−3 | .22552−3 | .16774−3 | .10996−3 | .52173−4 |
| 23 | .65751−3 | .59740−3 | .53729−3 | .47717−3 | .41706−3 | .35695−3 | .29684−3 | .28482−3 | .27281−3 | .26079−3 | .24875−3 | .23673−3 | .17661−3 | .11650−3 | .56390−4 |
| 24 | .68482−3 | .62241−3 | .56000−3 | .49759−3 | .43517−3 | .37276−3 | .31035−3 | .29787−3 | .28539−3 | .27290−3 | .26042−3 | .24794−3 | .18553−3 | .12312−3 | .60704−4 |
| 25 | .71191−3 | .64723−3 | .58255−3 | .51787−3 | .45319−3 | .38851−3 | .32383−3 | .31089−3 | .29796−3 | .28502−3 | .27209−3 | .25915−3 | .19447−3 | .12979−3 | .65109−4 |
| 50 | .13475−2 | .12326−2 | .11177−2 | .10029−2 | .88799−3 | .77312−3 | .65824−3 | .63526−3 | .61229−3 | .58931−3 | .56634−3 | .54336−3 | .28502−3 | .13652−3 | .19873−3 |
| 75 | .18495−2 | .16985−2 | .15476−2 | .13966−2 | .12456−2 | .10947−2 | .94369−3 | .91350−3 | .88330−3 | .85311−3 | .82292−3 | .79272−3 | .64176−3 | .49079−3 | .33982−3 |
| 100 | .22631−2 | .20848−2 | .19064−2 | .17281−3 | .15497−2 | .13714−2 | .11931−2 | .11574−2 | .11217−2 | .10861−2 | .10504−2 | .10147−2 | .83638−3 | .65804−3 | .47970−3 |

[a] The number following an entry indicates the power of 10 by which the tabulated value is to be multiplied.

In FIG. 5 accumulated helium in moles is plotted vertically and time horizontally for different blends. These when compared with Tables I and II show that the blend leads to less helium evolution than that resulting from Pu–238 or "typical" Pu–238 product.

To demonstrate the advantages attainable from this invention, comparisons are made for some of the more pertinent characteristics of 11, 20 and 50 year life cardiac pacemakers fueled alternatively with "typical" Pu–238 product, pure Pu–238, and 35% Pu–238:65% Pu–241. The results of calculations for these nine systems are summarized in Table VII.

for an additional 26 years, and if the rest of the system is adequately designed this 11-year device in the case of the blend is really a 37-year pacemaker.

The merits of the relatively flat thermal power characteristic of the blended Pu–238:Pu–241 fuel are much more advantageous when fuel characteristics are compared for a 50 year-life pacemaker or RTG device. As shown in Table VII in this instance the plus quantities for the blend over "typical" Pu–238 include: (1) 15.3% less helium generation; (2) a 1.045 max./min. thermal power output ratio compared to a 1.468 max./min. for "typical"

TABLE VII.—COMPARISON OF CHARACTERISTICS OF ALTERNATIVE FUELING FOR A PACEMAKER SYSTEM

[Basis: .123 watt minimum thermal output required for a RPCP a]

| Item | 11-year life design | | | 20-year life design d | | | 50-year life design | | |
|---|---|---|---|---|---|---|---|---|---|
| | "Typical Pu–238" | Pure Pu–238 | 35% Pu–238, 65% Pu–231 c | "Typical Pu–238" | Pure Pu–238 | 35% Pu–238, 65% Pu–241 | "Typical Pu–238" | Pure Pu–238 | 35% Pu–238 65% Pu–241 |
| Total fuel loading, grams | .3047 | .2458 | .6180 | .3265 | .2635 | .6180 | .4112 | .3323 | .6456 |
| Initial Pu–238, grams | .2453 | .2458 | .2163 | .2628 | .2635 | .2163 | .3310 | .3323 | .2260 |
| Initial Pu–241, grams | .0024 | .0000 | .4017 | .0026 | .0000 | .4017 | .0033 | .0000 | .4196 |
| Volume of fuel charge, cc f | .1892–1 | .1528–1 | .3838–1 | .2028–1 | .1637–1 | .3838–1 | .2554–1 | .2064–1 | .4010–1 |
| Initial specific power, watt/gram | .4392 | .5448 | .1990 | .4392 | .5448 | .1990 | .4392 | .5448 | .1990 |
| Initial power density, watt/cc | 7.071 | 8.771 | 3.205 | 7.071 | 8.771 | 3.205 | 7.071 | 8.771 | 3.205 |
| End of life specific power, watt/gram | .4037 | .5004 | .2104 | .3768 | .4667 | .2107 | .2992 | .3701 | .1905 |
| End of life power density, watt/cc | 6.500 | 8.056 | 3.388 | 6.066 | 7.514 | 3.392 | 4.817 | 5.959 | 3.067 |
| Initial power output, watt | .1338 | .1339 | .1230 | .1434 | .1436 | .1230 | .1806 | .1811 | .1285 |
| End of life power output, watt | .1230 | .1230 | .1300 | .1230 | .1230 | .1302 | .1230 | .1230 | .1230 |
| Maximum thermal output, watt | .1338 | .1339 | .1300 | .1434 | .1436 | .1302 | .1806 | .1811 | .1364 |
| Mean thermal output, watt g | .1283 | .1284 | .1275 | .1329 | .1330 | .1287 | .1500 | .1502 | .1318 |
| Ratio of maximum to minimum thermal output | 1.088 | 1.089 | 1.057 | 1.166 | 1.167 | 1.059 | 1.468 | 1.472 | 1.045 |
| Total thermal energy generated, watt year | 1.411 | 1.412 | 1.402 | 2.659 | 2.660 | 2.575 | 7.499 | 7.508 | 6.591 |
| Required total thermal energy, watt year | 1.353 | 1.353 | 1.353 | 2.460 | 2.460 | 2.460 | 6.150 | 6.150 | 6.150 |
| Excess energy input, percent | 4.33 | 4.38 | 3.62 | 8.08 | 8.14 | 4.66 | 21.93 | 22.08 | 7.17 |
| Cumulative helium generated, moles | .8416–4 | –8426–4 | .8088–4 | –1586–3 | .1587–3 | .1495–3 | .4472–3 | .4478–3 | .3880–3 |
| Ratio of helium generated to that for the 35% Pu–238–65% Pu–241 system | 1.041 | 1.042 | 1.000 | 1.060 | 1.061 | 1.000 | 1.153 | 1.154 | 1.000 | a Reference design parameter for RPCP is .123 thermal watt minimum, and 11-year life.
b Typical Pu–238 product assay of: .00012% Pu–236, 80.5% Pu–238, 14.9% Pu–239, 2.9% Pu–240, .8% Pu–241, .1% Pu–242, .5% Np–237.
c 35% Pu–238 and 65% Pu–241 assay corresponds to optimum power flattening over a 50-year period.
d For 35% Pu–238 and 65% Pu–241 system 11 year design life unit will also meet system requirements up to about 37 years.
e The number following an entry indicates the power of 10 by which the tabulated value is to be multiplied.
f Volume figures are based on an average density of 16.1 grams.
g Mean values calculated by three point approximate Simpson's rule.

Upon making comparisons of salient features and consequences of the alternative fuel loadings for an 11-year pacemaker, from an overall system standpoint the blended 35% Pu–238:65% Pu–241 fuel runs ahead of "typical" Pu–238 and pure Pu–238 on all counts except power density (watt/cm.³), as shown by the entries in Table VII. As listed in Table VII compared to "typical" Pu–238 product the blended fuel generates 4.1% less helium, and involves less energy dissipation, 3.62% compared to 4.33%. While the differences for an 11-year life are small there are advantages: (1) there is a distinct advantage to having a fuel thermal power curve that is on the rise (as it is for the blend) to counteract the anticipated natural degradation of the thermoelectric and electronic components; (2) because the specific thermal power curve for the blend fuel drops back to the zero-time value at about 37 years, in this instance, the fuel loading adequate for an 11-year life device is capable of running the pacemaker Pu–238; (3) 13.8% less required energy dissipation; (4) 31.7% less Pu–238 required for fueling the device.

Figure 6:
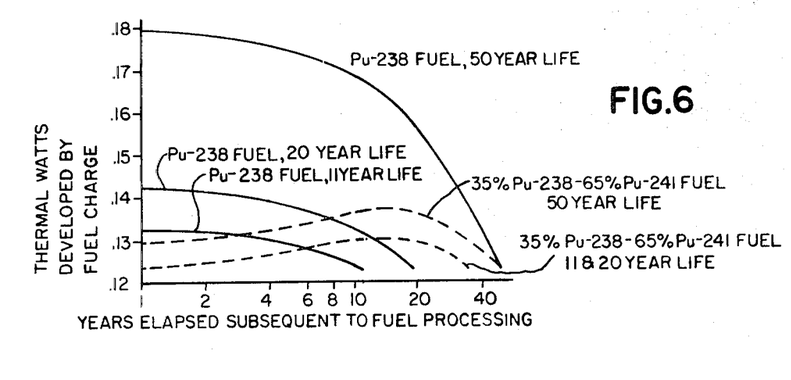
Figure 7A:
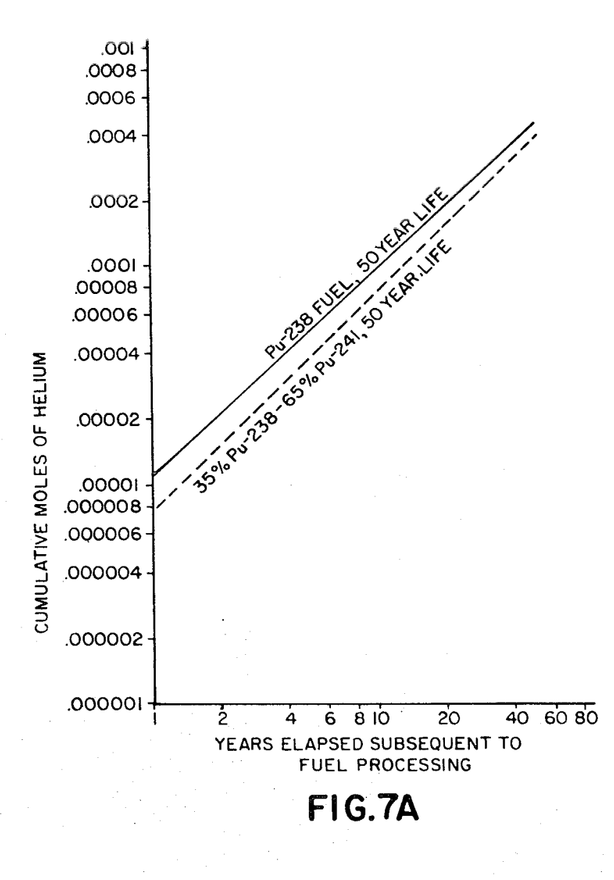
Figure 7B:
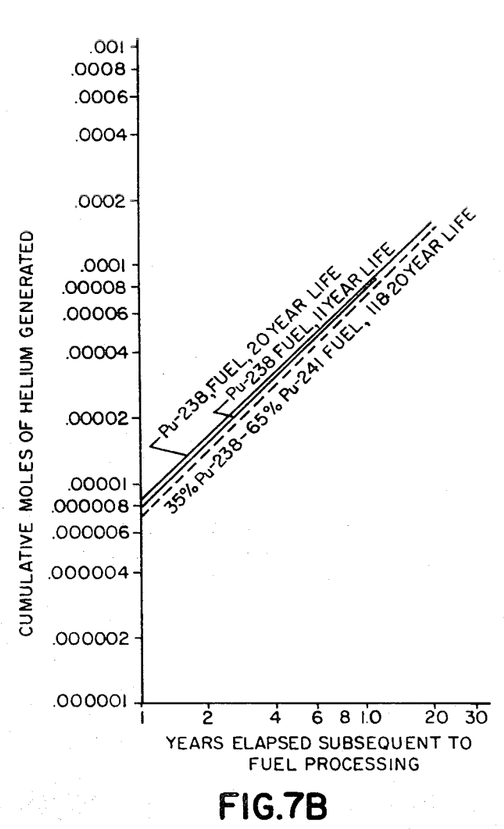

FIGS. 6, 7A and 7B which are graphical representations of some of the entries listed in Table VII highlight the superiority of the Pu–238:Pu–241 blend over pure and "typical" Pu–238 as regards more efficient utilization of developed isotopic thermal power and lower helium generation.

Figure 8:
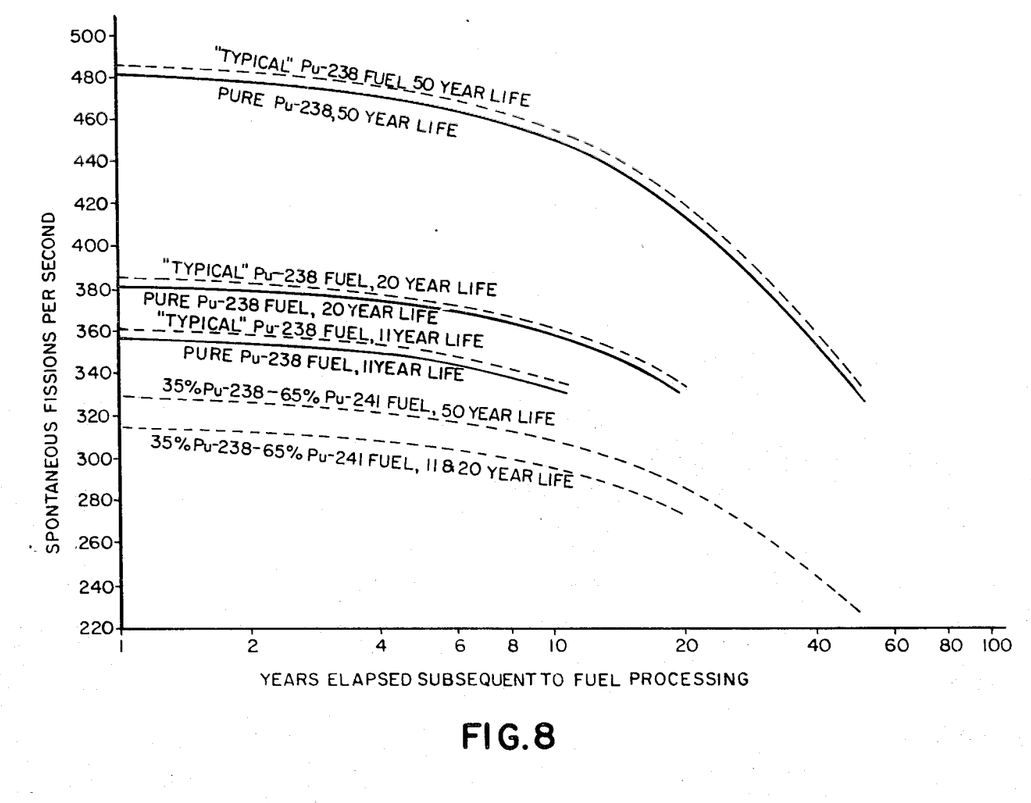

Another characteristic that makes blended Pu–238–Pu–241 more attractive than pure Pu–238 or "typical" Pu–238 product, is its lower propensity for spontaneous fissioning. For medical applications like the pacemaker, this is a particularly important advantage. As shown in Table VIII FIG. 8 the superiority of the blend over "typical" Pu–238 is pronounced in this regard that the 50-year device fueled with the blend involves less spontaneous fissioning and less spontaneous fission neutron emission than that for an 11-year pacemaker fueled with "typical" or pure Pu–238.

TABLE VIII.—COMPARISON OF SPONTANEOUS FISSION CHARACTERISTICS OF ALTERNATIVE FUELINGS FOR A RTG SYSTEM

[Basis: .123 watt minimum thermal output required for a RPCP[a]]

| | Spontaneous fissions per second | | | | | | | | | Total spontaneous fissions [f] | | | | | | | | |
|---|---|---|---|---|---|---|---|---|---|---|---|---|---|---|---|---|---|---|
| | 11-year life system | | | 20-year life system | | | 50-year life system | | | 11-year life system | | | 20-year life system | | | 50-year life system | | |
| Years elapsed | Typical Pu-238[b] | Pure Pu-238 | Mixed Fuel[c] | Typical Pu-238 | Pure Pu-238 | Mixed fuel[d] | Typical Pu-238 | Pure Pu-238 | Mixed fuel | Typical Pu-238[e] | Pure Pu-238 | Mixed fuel | Typical Pu-238 | Pure Pu-238 | Mixed fuel | Typical Pu-238 | Pure Pu-238 | Mixed fuel |
| 0 | 363.0 | 359.5 | 316.3 | 388.9 | 385.4 | 316.3 | 489.8 | 486.0 | 330.5 | | | | | | | | | |
| .5 | 361.6 | 358.1 | 315.1 | 387.4 | 383.9 | 315.1 | 487.9 | 484.1 | 329.9 | .5716+10 | .5661+10 | .4981+10 | .6124+10 | .6060+10 | .4981+10 | .7718+10 | .7653+10 | .5204+10 |
| 1 | 360.2 | 356.7 | 313.9 | 385.9 | 382.4 | 313.9 | 486.1 | 482.2 | 328.0 | .1141+11 | .1130+11 | .9943+10 | .1223+11 | .1223+11 | .9943+10 | .1540+11 | .1528+11 | .1039+11 |
| 2 | 357.4 | 353.9 | 311.6 | 383.0 | 379.4 | 311.4 | 482.3 | 478.5 | 325.5 | .2273+11 | .2251+11 | .1981+11 | .2435+11 | .2413+11 | .1981+11 | .3068+11 | .3044+11 | .2070+11 |
| 3 | 354.7 | 351.2 | 309.2 | 380.1 | 376.5 | 309.2 | 478.7 | 474.8 | 323.1 | .3397+11 | .3364+11 | .2961+11 | .3639+11 | .3606+11 | .2961+11 | .4584+11 | .4548+11 | .3093+11 |
| 4 | 352.0 | 348.5 | 306.9 | 377.2 | 373.6 | 306.9 | 475.0 | 471.2 | 320.7 | .4512+11 | .4468+11 | .3933+11 | .4833+11 | .4790+11 | .3933+11 | .6089+11 | .6040+11 | .4109+11 |
| 5 | 349.3 | 345.8 | 304.7 | 374.3 | 370.8 | 304.7 | 471.4 | 467.5 | 318.3 | .5617+11 | .5563+11 | .4898+11 | .6019+11 | .5964+11 | .4898+11 | .7582+11 | .7521+11 | .5117+11 |
| 6 | 346.7 | 343.2 | 302.4 | 371.5 | 367.9 | 302.4 | 467.9 | 464.0 | 315.9 | .6715+11 | .6650+11 | .5856+11 | .7196+11 | .7130+11 | .5856+11 | .9064+11 | .8991+11 | .6118+11 |
| 7 | 344.0 | 340.5 | 300.1 | 368.6 | 365.1 | 300.1 | 464.3 | 460.4 | 313.5 | .7805+11 | .7729+11 | .6836+11 | .8364+11 | .8286+11 | .6836+11 | .1053+12 | .1045+12 | .7111+11 |
| 8 | 341.4 | 337.9 | 297.8 | 365.8 | 362.2 | 297.8 | 460.7 | 456.8 | 311.2 | .8887+11 | .8800+11 | .7780+11 | .9522+11 | .9434+11 | .7780+11 | .1199+12 | .1190+12 | .8097+11 |
| 9 | 338.8 | 335.3 | 295.6 | 363.0 | 359.4 | 295.6 | 457.2 | 453.3 | 308.8 | .9960+11 | .9862+11 | .8716+11 | .1067+12 | .1057+12 | .8716+11 | .1344+12 | .1333+12 | .9075+11 |
| 10 | 336.2 | 332.7 | 293.4 | 360.3 | 356.7 | 293.4 | 453.8 | 449.8 | 306.5 | .1103+12 | .1092+12 | .9646+11 | .1181+12 | .1170+12 | .9646+11 | .1488+12 | .1476+12 | .1005+12 |
| 11 | 333.7 | 330.1 | 291.2 | 357.5 | 353.9 | 291.2 | 450.3 | 446.3 | 304.2 | .1208+12 | .1196+12 | .1057+12 | .1295+12 | .1282+12 | .1057+12 | .1631+12 | .1617+12 | .1101+12 |
| 12 | | | | 354.8 | 351.2 | 289.0 | 446.8 | 442.9 | 301.9 | | | | .1407+12 | .1394+12 | .1148+12 | .1772+12 | .1757+12 | .1197+12 |
| 13 | | | | 352.1 | 348.5 | 286.8 | 443.5 | 439.5 | 299.7 | | | | .1519+12 | .1504+12 | .1239+12 | .1913+12 | .1897+12 | .1292+12 |
| 14 | | | | 349.4 | 345.8 | 284.6 | 440.1 | 436.1 | 297.4 | | | | .1629+12 | .1614+12 | .1329+12 | .2052+12 | .2035+12 | .1386+12 |
| 15 | | | | 346.8 | 343.2 | 282.5 | 436.8 | 432.7 | 295.1 | | | | .1739+12 | .1722+12 | .1419+12 | .2190+12 | .2172+12 | .1479+12 |
| 16 | | | | 344.1 | 340.5 | 280.3 | 433.4 | 429.4 | 292.9 | | | | .1848+12 | .1830+12 | .1508+12 | .2328+12 | .2308+12 | .1572+12 |
| 17 | | | | 341.5 | 337.9 | 278.2 | 430.2 | 426.1 | 290.7 | | | | .1956+12 | .1937+12 | .1596+12 | .2464+12 | .2443+12 | .1664+12 |
| 18 | | | | 338.9 | 335.3 | 276.1 | 426.9 | 422.8 | 288.5 | | | | .2064+12 | .2043+12 | .1683+12 | .2599+12 | .2577+12 | .1755+12 |
| 19 | | | | 336.3 | 332.7 | 274.0 | 423.6 | 419.6 | 286.2 | | | | .2170+12 | .2149+12 | .1770+12 | .2733+12 | .2710+12 | .1846+12 |
| 20 | | | | 333.8 | 330.1 | 272.0 | 420.4 | 416.3 | 284.2 | | | | .2276+12 | .2253+12 | .1856+12 | .2867+12 | .2842+12 | .1936+12 |
| 21 | | | | | | | 417.2 | 413.1 | 282.0 | | | | | | | .2999+12 | .2973+12 | .2025+12 |
| 22 | | | | | | | 414.0 | 409.9 | 279.8 | | | | | | | .3130+12 | .3102+12 | .2114+12 |
| 23 | | | | | | | 410.8 | 406.8 | 277.2 | | | | | | | .3260+12 | .3231+12 | .2202+12 |
| 24 | | | | | | | 407.8 | 403.6 | 275.5 | | | | | | | .3389+12 | .3359+12 | .2289+12 |
| 25 | | | | | | | 404.5 | 400.5 | 273.5 | | | | | | | .3517+12 | .3486+12 | .2376+12 |
| 50 | | | | | | | 334.5 | 330.1 | 225.9 | | | | | | | .6433+12 | .6378+12 | .4346+12 |

[a] Reference design parameter for RPCP is .123 thermal watt minimum, and 11-year life.
[b] Typical Pu-238 product assay of: .00012% Pu-236, 80.5% Pu-238, 14.9% Pu-239 2.9% Pu-240, .8% Pu-241, .1% Pu-242, .5% Np-237.
[c] Mixed fuel assay of 35% Pu-238 and 65% Pu-241 corresponding to optimum power flattening over a 50-year period.
[d] For 35% Pu-238 and 65% Pu-241 system the 11-year design life unit will also meet system requirements up to about 37 years.
[e] The number following an entry indicates the power of 10 by which the tabulated value is to be multiplied.
[f] Integration for total spontaneous fissions based on the mean fission rate for each time increment.

The last group of entries in Table VIII lists the total spontaneous fissions for 11, 20, and 50 year pacemakers fueled alternatively with pure Pu-238, "typical" Pu-238 and 35% Pu-238:65% Pu-241. Comparing the 50 year device characteristics, throughout the 50 year period the implantee would be exposed to 48 percent less spontaneous fissions (2.09 × 10[11] fissions) while wearing a blended fuel pacemaker.

Similar advantages in favor of the "blended" fuel would result from the consequences of lower total alpha particle emission and more favorable characteristics as regards gamma photon total yield and energy spectrum.

Although the cardiac pacemaker has been used as an example to show the advantages of this invention explicitly, it is emphasized that applications of the blended fuel have similar benefits in other radioisotope thermoelectrical power generating systems and devices including medical appliances and artificial substitute organs, communications systems (space, underwater, buried), and in terrestrial and space power systems. While the examples cited use Pu-238 and Pu-241 as the parent nuclides, the principal aspect of this invention is the admixture of a nuclide system with a rising power characteristic (specially Pu-241, or other nuclide with rising characteristic) to a nuclide system with a falling power characteristic (which includes the aforementioned Co-60, Sr-90, Cs-137, Ce-144, Pm-147, Tm-170, Po-210, Th-228, Pu-238, Am-241, Cm-242, and Cm-244). Accordingly, this invention embraces all applications of Pu-241 or like nuclide to "fatten" up the falling power characteristic of any or all of the aforementioned other nuclide systems.

While a preferred embodiment has been disclosed herein many modifications thereof are feasible. This invention should then not be restricted except insofar as is necessitated by the prior art.

I claim as my invention:

1. A radioisotope fuel source including a blend predominately of about 30% to 40% of Pu-238 and about 70% to 60% of Pu-241.

2. The source of claim 1 wherein the blend includes about 35% Pu-238 and about 65% of Pu-241.

References Cited

UNITED STATES PATENTS

| | | | |
|---|---|---|---|
| 2,859,095 | 11/1958 | Manning et al. | 176—16 |
| 2,887,357 | 5/1959 | Seaborg et al. | 176—16 |
| 2,975,113 | 3/1961 | Gordon | 176—15 |
| 3,190,804 | 6/1965 | Seaborg et al. | 252—301.1 |
| 3,360,477 | 12/1967 | Acree et al. | 252—301.1 |

OTHER REFERENCES

Nuclear Science and Eng., vol. 11, 1961, 324–327, Dudziak et al.

ANL–6933, 1964, pp. 7–9, 17–19, 24, 26–28.

TID–20647, May 1962, pp. 1, 17.

DP–1066, vol. II, May 1966, pp. I–4, I–5, I–9, I–10, I–12, I–14, I–17, I–23, I–30, I–35, I–82, I–85, II–13.

CARL D. QUARFORTH, Primary Examiner

H. E. BEHREND, Assistant Examiner